United States Patent [19]

Coleman

[11] 4,350,237

[45] Sep. 21, 1982

[54] FAIL-SAFE BRAKE LINKAGE

[75] Inventor: David L. Coleman, Dubuque, Iowa

[73] Assignee: Deere & Company, Moline, Ill.

[21] Appl. No.: 170,264

[22] Filed: Jul. 18, 1980

[51] Int. Cl.³ .......................... B60T 7/12; F16D 65/14
[52] U.S. Cl. ............................... 192/116.5; 74/480 R; 188/170
[58] Field of Search .................. 192/116.5; 74/480 R, 74/479; 188/170; 180/271

[56] References Cited

U.S. PATENT DOCUMENTS

| | | | |
|---|---|---|---|
| 1,943,287 | 1/1934 | Campbell | 188/170 X |
| 2,031,062 | 2/1936 | Peabody et al. | 188/170 X |
| 2,531,055 | 11/1950 | Kirk | 188/170 X |
| 3,974,899 | 8/1976 | Mita et al. | 188/170 X |

Primary Examiner—Rodney H. Bonck

[57] ABSTRACT

The fail-safe brake linkage includes a hydraulic cylinder acting upon first levers. The first levers are rotatably mounted on a respective shaft. Also rotatably mounted to each shaft is a plurality of levers connected to brake activation rods. Each first lever is biased against a respective cylinder rod of the hydraulic cylinder. During vehicle operation, hydraulic pressure is supplied to the hydraulic cylinder to extract the cylinder rods against a respective first lever, causing each first lever to assume a position which allows normal operation of the brake connecting rods. Should the vehicle lose hydraulic pressure, the hydraulic cylinder retracts, thereby allowing the biased first levers to assume a position which results in the automatic applying of the vehicle brakes.

2 Claims, 3 Drawing Figures

FAIL-SAFE BRAKE LINKAGE

BACKGROUND OF THE INVENTION

This invention relates to a vehicle brake system and is particularly suited for employment in vehicles which utilize the braking system to steer the vehicle.

In vehicles such as off-road vehicles, i.e. crawler-tractors, the loss of vehicle hydraulic pressure can present a dilatorious condition for the vehicle and an unsafe condition for those persons in the vehicle work area. It is customary for a vehicle to contain warning devices to indicate the complete or partial loss of vehicle hydraulic pressure, however, should the operator's attention be directed elsewhere, substantial damage can occur to the vehicle before the operator discovers the loss of hydraulic pressure. It is also recognized that the loss of vehicle hydraulic pressure could render uncontrollable certain vehicle functions which would present an unsafe condition to those persons in the work area.

The present invention presents a means of automatically applying the vehicle's braking system, should the vehicle experience the loss of or substantial reduction in hydraulic pressure.

SUMMARY OF THE INVENTION

The present invention is particularly suited for employment in vehicles which use their braking system to serve an additional function of steering the vehicle such as the case in crawler-tractors. A hydraulic cylinder with a plurality of cylinder rods is biased to abut a plurality of first levers. Each of the first levers is rotatably mounted on a respective shaft which is rotatably mounted to the vehicle and has a stop arm mounted thereto. A second and third lever is also fixably mounted to each shaft having brake actuation rods mounted to each lever arm. Should the vehicle lose hydraulic pressure, the hydraulic cylinder rods will retract causing the first levers to rotate and allow the obstructing arm of the first levers to assume a position which corresponds to the automatic application of the vehicle brakes. That is, the obstructing arm of each first lever urges a respective second lever to assume a position whereby the vehicle brakes are applied.

It is an objective of the present invention to present a means of automatically activating a vehicle's brake system should the vehicle experience a sufficient decrease in vehicle hydraulic pressure.

DETAILED DESCRIPTION OF THE PREFERRED EMBODIMENT

Figure 1:
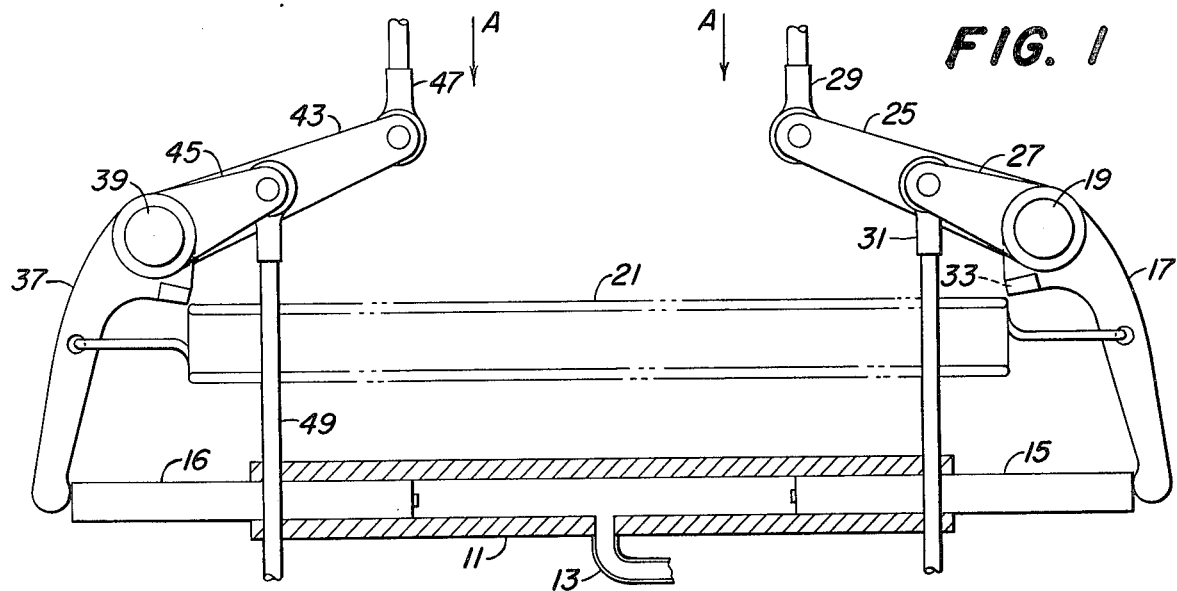
FIG. 1 is a schematic of the fail-safe brake linkage in a fail-safe disengage position.

Referring to FIG. 1, a hydraulic cylinder 11 receives pressure influenced by hydraulic fluid conduit 13. The hydraulic cylinder 11 has a first and second cylinder rod 15 and 16, respectively, extendable from a respective end of the hydraulic cylinder upon the introduction of fluid into the hydraulic cylinder 11.

Cylinder rod 15 abuts one end of a first lever 17 which is rotatably mounted on a shaft 19 which in turn is rotatably mounted by any conventional means to a carrying vehicle. The first lever 17 is biased against the first cylinder rod 15 by a spring 21 in a manner to be described later. Fixably mounted by any conventional means to shaft 19 is a third lever 27 and second lever 25 in parallel alignment. Pivotally mounted by any conventional means to linking lever 25 is a brake activation rod 29, and pivotally mounted by any conventional means to the second linking lever 27 is a second brake activation rod 31. The brake activation arm 29 is in communication with a vehicle brake pedal (not shown). The brake activation arm 31 is in communication with the brake activation system (not shown) to activate the braking system on one side of a vehicle in the preferred embodiment.

Cylinder rod 16 abuts one end of a second first lever 37 rotatably mounted on a shaft 39 which is in turn rotatably mounted on the vehicle. The lever 37 is biased by spring 21 attached thereto at one end against the second cylinder rod 16, the spring 21 being attached at the other end to first lever 17 to bias lever 17 against cylinder rod 15. Also, fixably mounted by any conventional means on shaft 39 in parallel alignment is a second lever 43 identical to lever 25 and a third lever 45 identical to lever 27. Pivotally mounted to lever 43 is a brake activation rod 47 and pivotally mounted to lever 45 is a brake activation rod 49. The brake activation arm 47 is in communication with a vehicle brake pedal (not shown). The brake activation arm 49 is in communication with the brake activation system (not shown) to activate the braking system on the other side of the vehicle in the preferred embodiment.

The linking arms 17 and 37 have an extension 33 oriented to permit extension 33 to assume an abutting orientation to lever 27 or 45, respectively.

Figure 2:
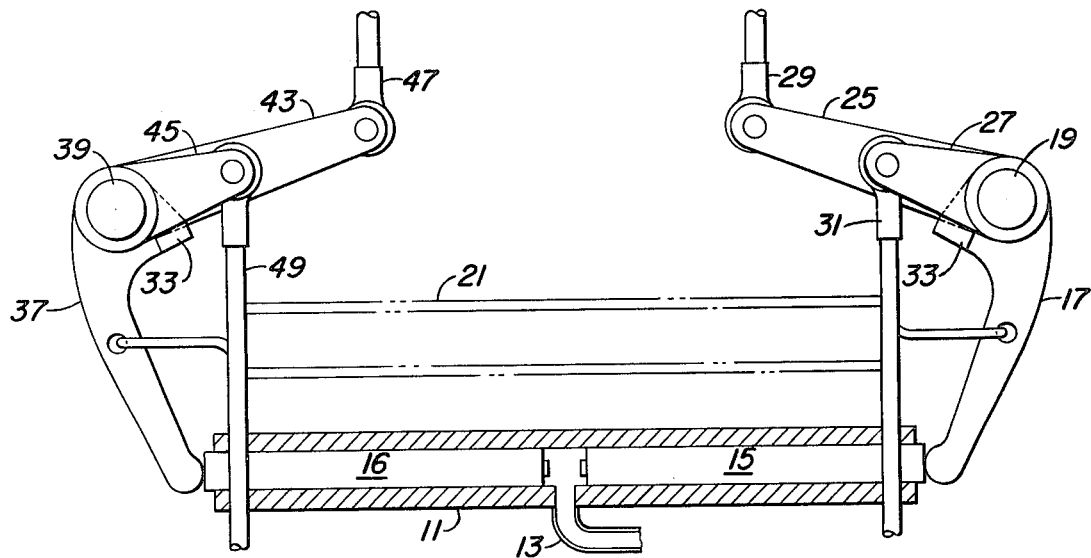
FIG. 2 is a schematic of the fail-safe brake linkage in a fail-safe engage position.
Figure 3:
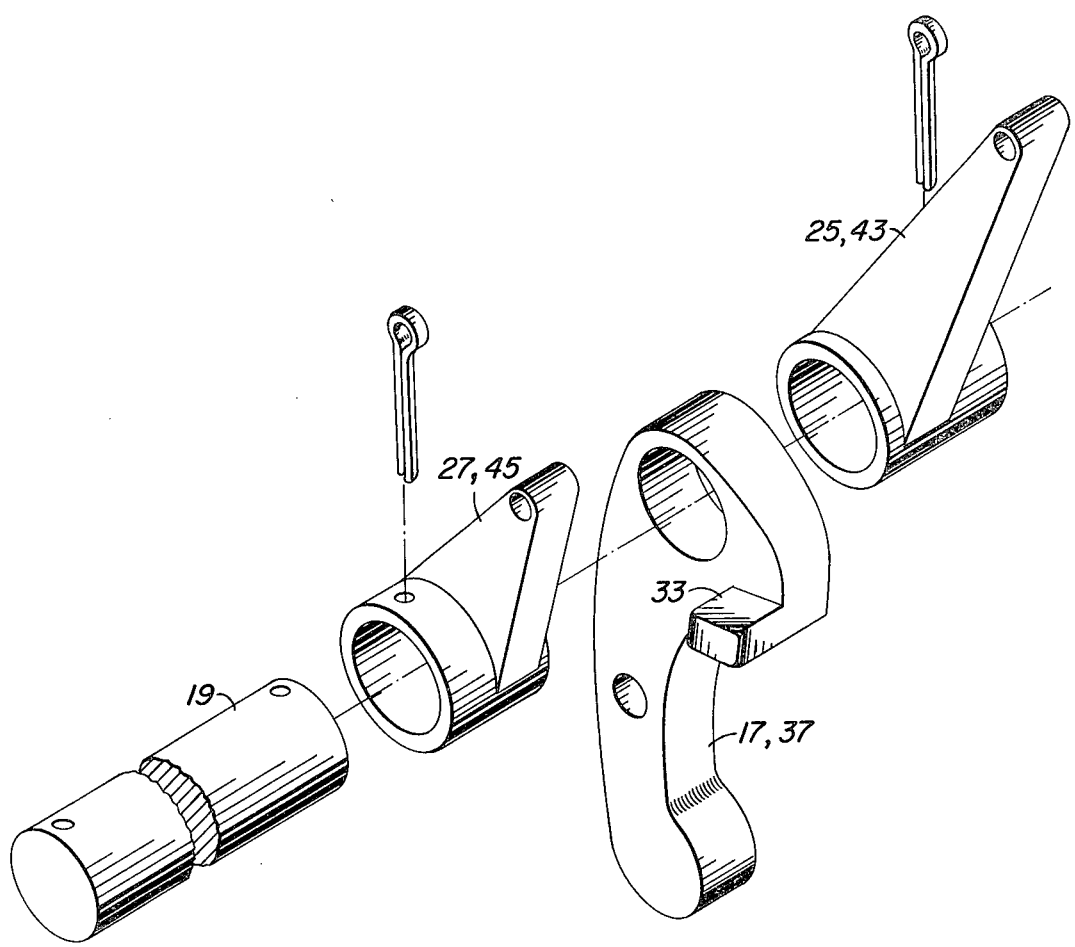
FIG. 3 is an exploded view of the brake levers in accordance with the present invention.

The preferred embodiment of the present invention has been described for operation in a vehicle which is brake steered, for example, as is the case with crawler-tractors. FIG. 1 schematically shows the fail-safe brake linkage in a disengaged mode with the vehicle brakes on. To release the vehicle's brakes, actuation rods 29 and 47 are displaced in the direction of arrows A. Referring to FIG. 2, should the vehicle lose hydraulic fluid pressure, the pressure loss allows cylinder rods 15 and 16 to retract, thereby allowing levers 17 and 37 to rotate on their respective shafts 19 and 39, rotation being urged by spring 21. Rotation of first levers 17 and 37 places extension 33 in an obstructing position with respect to the lever 27 and 45 respectively to maintain the levers 27 and 45 in a brake "on" position.

While the present invention has been shown and described in connection with a preferred embodiment, it will be obvious to a person skilled in the art that various changes in structure and arrangement and minor modifications may be made without departing from the spirit and essential characteristics of the invention as defined by the scope in the appended claims.

I claim:
1. A fail-safe brake linkage for a vehicle comprising:
 a. hydraulic cylinder having a cylinder rod extendable therefrom upon the introduction of pressure influenced hydraulic fluid therein, said cylinder rod to be retractable should the hydraulic cylinder pressure be reduced;
 b. a first lever having one end abutting said cylinder rod;
 c. biasing means for biasing said first lever against said cylinder rod;

d. a shaft rotatably mounted in said vehicle, said first lever being rotatably mounted around said shaft; and e. first means for activating and deactivating said vehicle's braking system, said first means to communicate with said first lever such that said vehicle's braking system is automatically activated should said hydraulic cylinder experience a pressure decrease, including
  i. a second lever fixably mounted on said shaft;
  ii. brake actuation means for activating said braking system;
  iii. a first actuation rod pivotally mounted to said second lever and in responsive communication with said brake actuation means;
  iv. a second actuation rod pivotally mounted to said second lever and in responsive communication with said braking system; and
  v. said first lever including a stop member oriented to allow said stop member to abut said second lever such that said vehicle's brakes are activated, whereby, should said hydraulic cylinder experience decreased pressure, said biasing member causes said first lever to rotate placing said stop member in an abutting relationship to said second lever.

2. A fail-safe brake linkage for a vehicle comprising:
a. hydraulic cylinder having a cylinder rod extendable therefrom upon the introduction of pressure influenced hydraulic fluid therein, said cylinder rod to be retractable should the hydraulic cylinder pressure be reduced;

b. a first lever having one end abutting said cylinder rod;

c. biasing means for biasing said first lever against said cylinder rod;

d. a shaft fixably mounted in said vehicle, said first lever being rotatably mounted around said shaft; and e. first means for activating and deactivating said vehicle's braking system, said first means to communicate with said first lever such that said vehicle's braking system is automatically activated should said hydraulic cylinder experience a pressure decrease, including
  i. a second lever rotatably mounted on said shaft;
  ii. brake actuation means for activating said braking system;
  iii. a first actuation rod pivotally mounted to said second lever and in responsive communication with said brake actuation means;
  iv. a second actuation rod pivotally mounted to said second lever and in responsive communication with said braking system;
  v. said first lever including a stop member oriented to allow said stop member to abut said second lever such that said vehicle's brakes are activated, whereby, should said hydraulic cylinder experience decreased pressure, said biasing member causes said first lever to rotate placing said stop member in an abutting relationship to said second lever.

* * * * *